(12) United States Patent
Chain et al.

(10) Patent No.: US 6,427,887 B1
(45) Date of Patent: Aug. 6, 2002

(54) GOLF BAG AND ACCESSORY SUPPORT APPARATUS FOR A VEHICLE

(76) Inventors: Le Roy Chain; Lois Chain, both of 2616 College Rd., Holt, MI (US) 48842; Amos Zapata, 641 High St., Charlotte, MI (US) 48813

( * ) Notice: Subject to any disclaimer, the term of this patent is extended or adjusted under 35 U.S.C. 154(b) by 0 days.

(21) Appl. No.: 09/586,021

(22) Filed: Jun. 2, 2000

(51) Int. Cl.⁷ ................................................ B60R 7/00
(52) U.S. Cl. .................... 224/275; 224/42.39; 224/543; 224/558; 224/568
(58) Field of Search .................................. 224/274, 275, 224/42.33, 42.39, 543, 555, 558, 568, 571; 206/315.3, 315.7

(56) References Cited

U.S. PATENT DOCUMENTS

| | | | |
|---|---|---|---|
| 2,797,033 A | * 6/1957 | Rasbach | 224/275 |
| 2,822,969 A | * 2/1958 | Cooper | 224/42.32 |
| 3,884,439 A | * 5/1975 | Jeninga | 248/96 |
| 4,061,257 A | 12/1977 | St. Clair | |
| 5,076,651 A | 12/1991 | White | |
| 5,178,444 A | 1/1993 | May et al. | |
| 5,356,061 A | * 10/1994 | Yu | 224/275 |
| 5,415,457 A | * 5/1995 | Kifer | 297/188.04 |
| D365,705 S | 1/1996 | Deeley | |
| 5,556,064 A | 9/1996 | Cowe | |
| 5,806,738 A | 9/1998 | D'angelo | |
| 6,039,227 A | * 3/2000 | Stark | 224/521 |
| D434,587 S | * 12/2000 | Beard, Sr. | D6/552 |

* cited by examiner

*Primary Examiner*—Stephen K. Cronin

(57) ABSTRACT

A golf bag and accessory support apparatus for safely and securely transporting golf bags with golf clubs. The golf bag and accessory support apparatus includes a frame having a plurality of cross members and upright members; and also includes a plurality of arm members being spaced apart and extending outwardly from the frame; and further includes a plurality of padded members securely mounted about portions of the frame and the arm members to protect the golf bags with golf clubs; and also includes strap members securely attached to the frame for supporting and securing the golf bags with golf clubs; and further includes clamping members securely attached to the frame and being fastenable about a structure inside the vehicle.

16 Claims, 3 Drawing Sheets

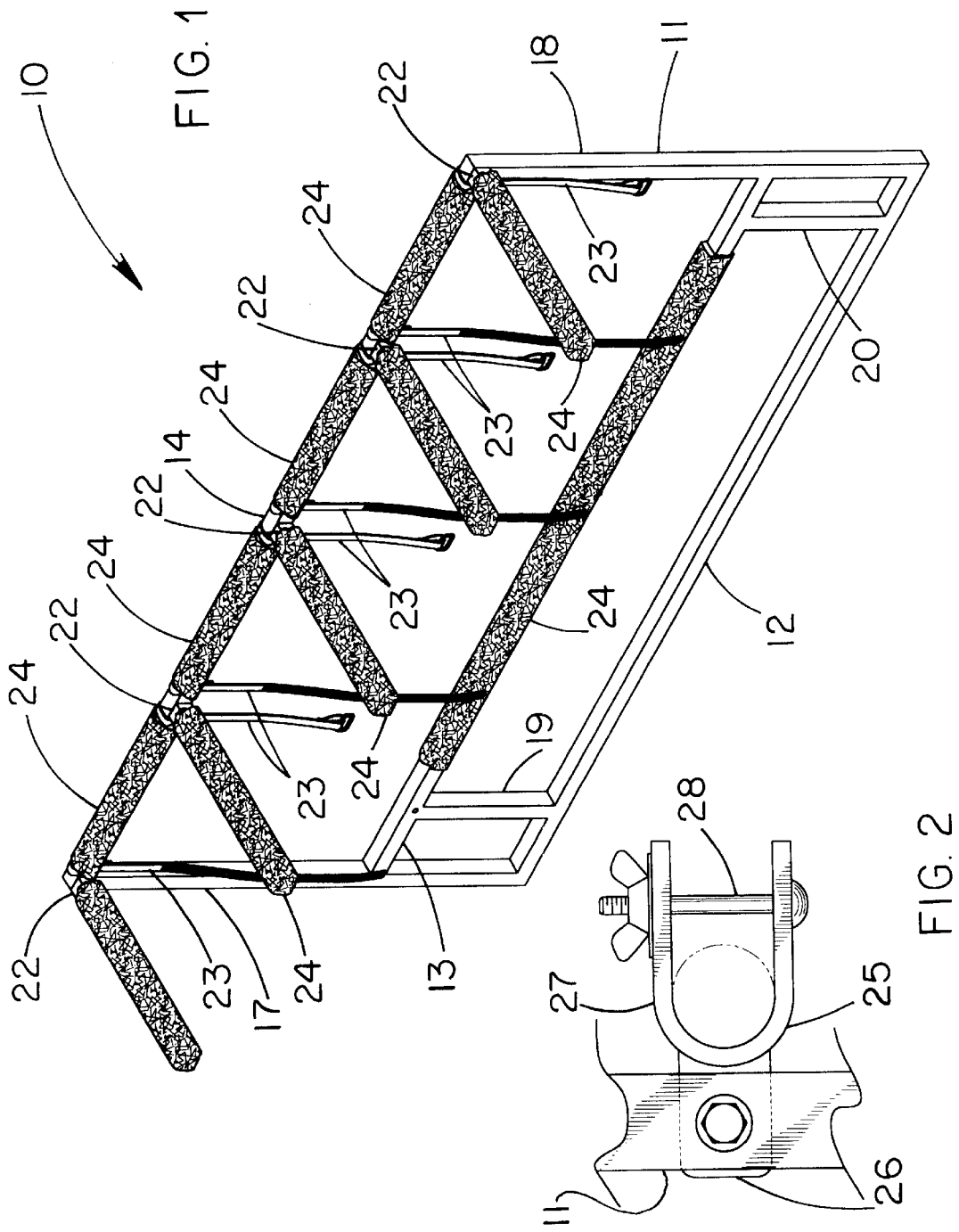

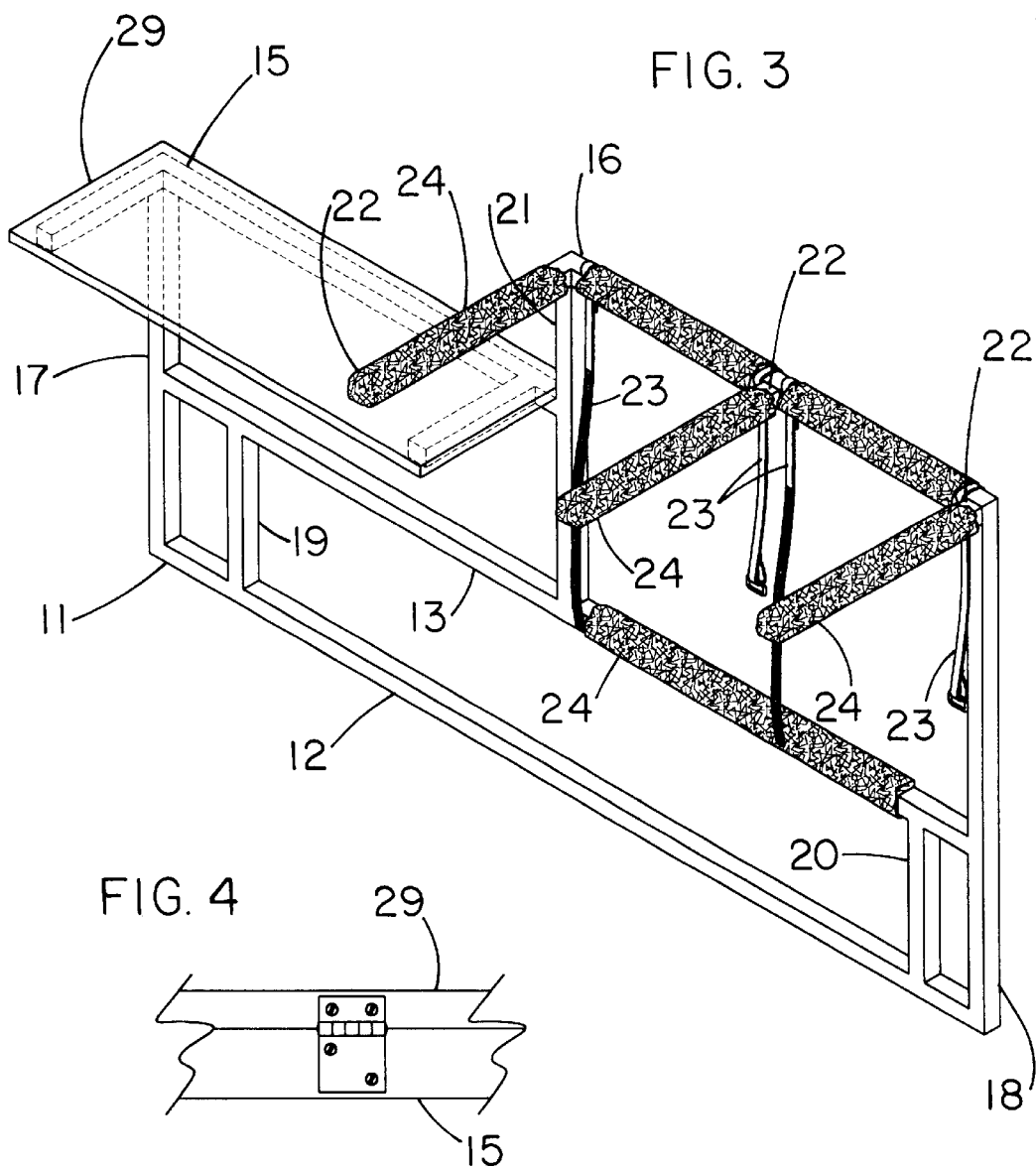

GOLF BAG AND ACCESSORY SUPPORT APPARATUS FOR A VEHICLE

BACKGROUND OF THE INVENTION

1. Field of the Invention

The present invention relates to a golf caddy for a vehicle and more particularly pertains to a new golf bag and accessory support apparatus for safely and securely transporting golf bags with golf clubs.

2. Description of the Prior Art

The use of a golf caddy for a vehicle is known in the prior art. More specifically, a golf caddy for a vehicle heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,076,651; U.S. Pat. No. 5,178,444; U.S. Pat. No. 5,806,738; U.S. Pat. No. Des. 365,705; U.S. Pat. No. 4,061,257; and U.S. Pat. No. 5,556,064.

While these devices fulfill their respective, particular objectives and requirements, the aforementioned patents do not disclose a new golf bag and accessory support apparatus. The inventive device includes a frame having a plurality of cross members and upright members; and also includes a plurality of arm members being spaced apart and extending outwardly from the frame; and further includes a plurality of padded members securely mounted about portions of the frame and the arm members to protect the golf bags with golf clubs; and also includes strap members securely attached to the frame for supporting and securing the golf bags with golf clubs; and further includes clamping members securely attached to the frame and being fastenable about a structure inside the vehicle.

In these respects, the golf bag and accessory support apparatus according to the present invention substantially departs from the conventional concepts and designs of the prior art, and in so doing provides an apparatus primarily developed for the purpose of safely and securely transporting golf bags with golf clubs.

SUMMARY OF THE INVENTION

In view of the foregoing disadvantages inherent in the known types of golf caddy for a vehicle now present in the prior art, the present invention provides a new golf bag and accessory support apparatus construction wherein the same can be utilized for safely and securely transporting golf bags with golf clubs.

The general purpose of the present invention, which will be described subsequently in greater detail, is to provide a new golf bag and accessory support apparatus which has many of the advantages of the golf caddy for a vehicle mentioned heretofore and many novel features that result in a new golf bag and accessory support apparatus which is not anticipated, rendered obvious, suggested, or even implied by any of the prior art golf caddy for a vehicle, either alone or in any combination thereof.

To attain this, the present invention generally comprises a frame having a plurality of cross members and upright members; and also includes a plurality of arm members being spaced apart and extending outwardly from the frame; and further includes a plurality of padded members securely mounted about portions of the frame and the arm members to protect the golf bags with golf clubs; and also includes strap members securely attached to the frame for supporting and securing the golf bags with golf clubs; and further includes clamping members securely attached to the frame and being fastenable about a structure inside the vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new golf bag and accessory support apparatus which has many of the advantages of the golf caddy for a vehicle mentioned heretofore and many novel features that result in a new golf bag and accessory support apparatus which is not anticipated, rendered obvious, suggested, or even implied by any of the prior art golf caddy for a vehicle, either alone or in any combination thereof.

It is another object of the present invention to provide a new golf bag and accessory support apparatus which may be easily and efficiently manufactured and marketed.

It is a further object of the present invention to provide a new golf bag and accessory support apparatus which is of a durable and reliable construction.

An even further object of the present invention is to provide a new golf bag and accessory support apparatus which is susceptible of a low cost of manufacture with regard to both materials and labor, and which accordingly is then susceptible of low prices of sale to the consuming public, thereby making such golf bag and accessory support apparatus economically available to the buying public.

Still yet another object of the present invention is to provide a new golf bag and accessory support apparatus which provides in the apparatuses and methods of the prior art some of the advantages thereof, while simultaneously overcoming some of the disadvantages normally associated therewith.

Still another object of the present invention is to provide a new golf bag and accessory support apparatus for safely and securely transporting golf bags with golf clubs.

Yet another object of the present invention is to provide a new golf bag and accessory support apparatus which includes a frame having a plurality of cross members and upright members; and also includes a plurality of arm members being spaced apart and extending outwardly from the frame; and further includes a plurality of padded members securely mounted about portions of the frame and the arm members to protect the golf bags with golf clubs; and also includes strap members securely attached to the frame for supporting and securing the golf bags with golf clubs; and further includes clamping members securely attached to the frame and being fastenable about a structure inside the vehicle.

Still yet another object of the present invention is to provide a new golf bag and accessory support apparatus that protects not only the golf clubs and golf bags from being banged around during the transportation thereof but also the user's when opening the door to retrieve the golf bags and golf clubs.

Even still another object of the present invention is to provide a new golf bag and accessory support apparatus that prevents the interior of the vehicle from being damaged during the transporting of the golf bag with golf clubs.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the first embodiment of a new golf bag and accessory support apparatus according to the present invention.

FIG. 2 is a detailed side elevational view of a clamping member of the present invention.

FIG. 3 is a perspective view of the second embodiment of the present invention.

FIG. 4 is a detailed side elevational view of the second embodiment of the shelf member of the present invention.

DESCRIPTION OF THE PREFERRED EMBODIMENT

Figure 5:
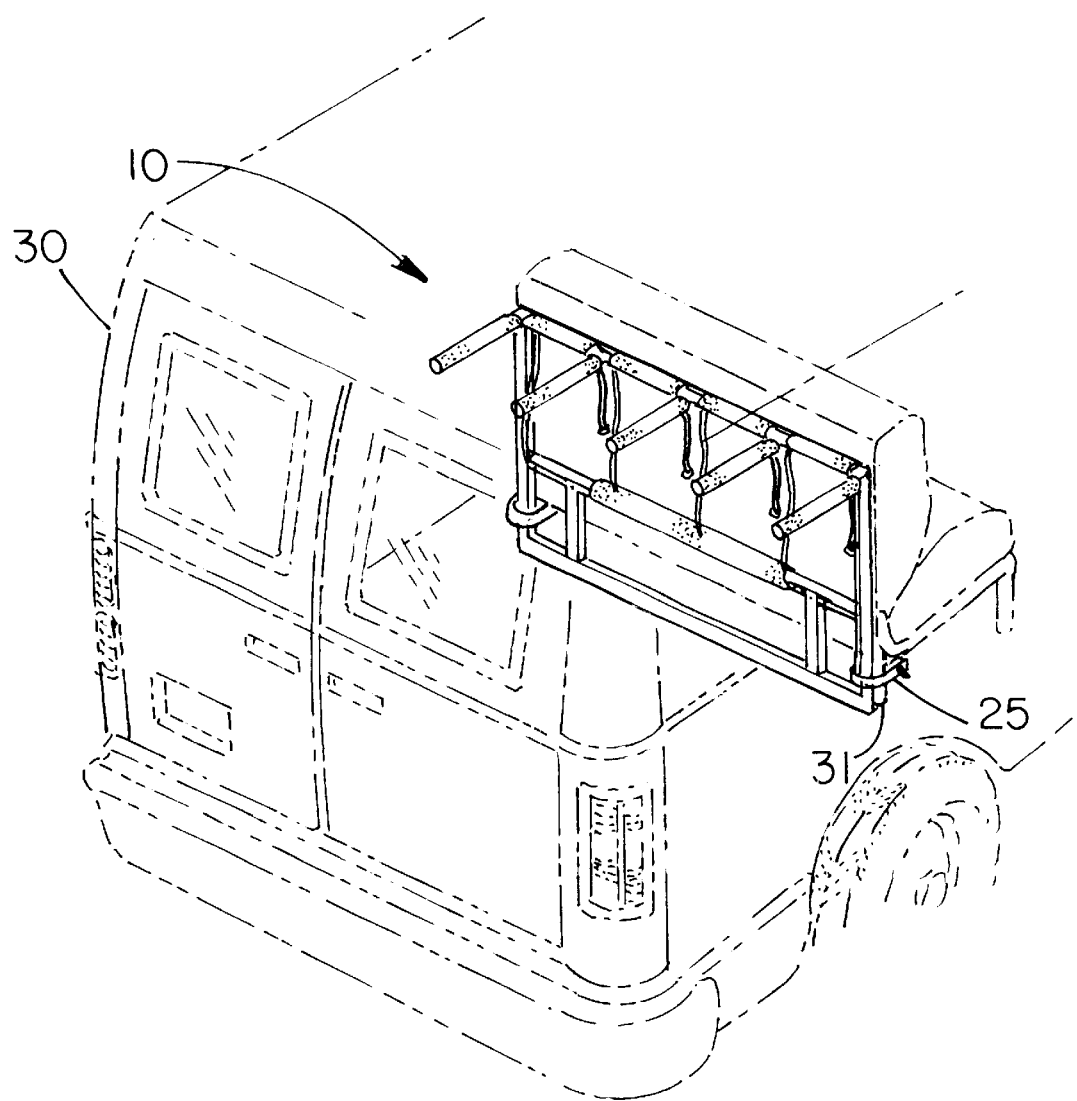
FIG. 5 is a perspective view of the first embodiment of the present invention being securely disposed inside a vehicle.

With reference now to the drawings, and in particular to FIGS. 1 through 5 thereof, a new golf bag and accessory support apparatus embodying the principles and concepts of the present invention and generally designated by the reference numeral 10 will be described.

As best illustrated in FIGS. 1 through 5, the golf bag and accessory support apparatus 10 generally comprises a frame 11 having a plurality of elongate cross members 12–16 and a plurality of upright members 17–21 securely and conventionally attached to one or more of the elongate cross members 12–16. A plurality of arm members 22 are spaced apart and securely and conventionally attached to and extend outwardly from the frame 11. A plurality of padded members 24 are securely and conventionally mounted about portions of the frame 11 and about the arm members 22. The golf bag and accessory support apparatus 10 also includes means for securing golf bags to the frame 11 and means for fastening the frame 11 to a structure 31 securely disposed inside a vehicle 30 including a clamping member 25 having a shaft portion 26 which is securely bolted to the frame 11 with a fastening member, and further having a U-shaped portion 27 for mounting about a portion of the structure 31; and further includes a fastener 28 lockingly extendable through end portions of the U-shaped portion 27 for securing the clamping member 25 to the structure 31 inside the vehicle 30.

As a first embodiment, the elongate cross members 12–16 include a base cross member 12 having ends and being adapted to rest upon a floor of the vehicle 30, an intermediate cross member 13 which is spaced above the base cross member 12 and which has ends securely and conventionally attached to a plurality of the upright members 17–21, and an upper cross member 14 which is spaced above the intermediate cross member 13 and which has ends securely and conventionally attached to a plurality of the upright members 17, 18 with the upright members 17–21 including a pair of elongate upright members 17, 18 securely and conventionally attached along the ends of the elongate cross members 12–16, and also including a pair of brace upright members 19, 20 securely and conventionally attached to and interconnecting the base cross member 12 and the intermediate cross member 13. The arm members 22 have ends which are securely and conventionally attached to the upper cross member 14 with the arm members 22 being spaced along the upper cross member 14 and extending outwardly generally perpendicular to the upper cross member 14 and being adapted to receive and support golf bags therebetween. The padded members 24 are securely attached about the upper cross member 16 and about at least a portion of the intermediate cross member 13. The means for securing golf bags to the frame 11 includes pairs of strap members 23 having ends securely and conventionally attached to the frame 11 with the pairs of strap members 23 being spaced along the upper cross member 14. Each pair of strap members 23 is disposed between a respective pair of arm members 22 which are disposed adjacent to one another.

As a second embodiment, the elongate cross members 12–16 include a base cross member 12 having ends and being adapted to rest upon a floor of the vehicle 30, an intermediate cross member 13 which is spaced above the base cross member 12 and which has ends securely and conventionally attached to a plurality of the upright members 17, 18, and a pair of upper cross members 15, 16 which are spaced above the intermediate cross member 13 and which have ends securely and conventionally attached to a plurality of the upright members 17, 18, 21 with one of the upper cross members 15 being disposed lower than the other of the upper cross members 16. The golf bag and accessory support apparatus 10 further includes a shelf member 29 being hingedly mounted to the lower disposed upper cross member 15 and being movably disposed horizontally for supporting accessory items thereupon. The upright members 17–21 include a first elongate upright member 18 securely and conventionally attached along one of the ends of the base cross member 12, the intermediate cross member 13, and the higher disposed upper cross member 16; and also include a second elongate upright member 17 securely and conventionally attached to the other of the ends of the base cross member 12 and the intermediate cross member 13 and to one of the ends of the lower disposed cross member 15; and further include a pair of brace upright members 19, 20 securely and conventionally attached to and interconnecting the base cross member 12 and the intermediate cross member 13; and also include an intermediate upright member 21 which is securely and conventionally attached to the intermediate cross member 13 and to the other of the ends of the upper cross members 15, 16. The arm members 22 have ends which are securely and conventionally attached to the higher disposed upper cross member 16 with the arm members 22 being spaced along the higher disposed upper cross member 16 and extending outwardly generally perpendicular to the higher disposed upper cross member 16 and being adapted to receive and support golf bags therebetween. The padded members 24 are securely and conventionally attached about the higher disposed upper cross member 16 and about at least a portion of the intermediate cross member 13. The means for securing golf bags to the frame 11 includes pairs of strap members 23 having ends securely and conventionally attached to the frame 11 with the pairs of strap members 23 being spaced along the higher disposed upper cross member 16 and with each pair of strap members 23 being disposed between a respective pair of the arm members 22 which are disposed adjacent to one another.

In use, the golf bag and accessory support apparatus 10 can be conveniently and easily mounted in the cargo-hold of a van 30, in particular, and can be securely fastened to either the back seat 31 or to a mobile bed structure 31 inside the van 30. Instead of the user either lying the golf bags with golf clubs upon the floor of the van or leaning the golf bags with golf clubs against the side wall of the van 30 or against the back seat 31, the user can secure the golf bag with golf clubs between two adjacently-spaced arm members 22 and can fasten the strap members 23 about the golf bag so that the golf bag with clubs do not fall and also allows other accessories and objects to be placed in the van 30.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A golf bag and accessory support apparatus for a vehicle comprising:
    a frame having a plurality of elongate cross members and a plurality of upright members securely attached to one or more of said elongate cross members;
    a plurality of arm members being spaced apart and securely attached to and extending outwardly from said frame;
    a plurality of padded members securely mounted about portions of said frame and about said arm members;
    means for securing golf bags to said frame; and
    means for fastening said frame to a structure securely disposed inside a vehicle.

2. A golf bag and accessory support apparatus for a vehicle as described in claim 1, wherein said means for fastening said frame to a structure inside a vehicle includes a clamping member having a shaft portion which is securely mounted to said frame with a fastening member, and further having a U-shaped portion for mounting about a portion of the structure, and further includes a fastener lockingly extendable through end portions of said U-shaped portion.

3. A golf bag and accessory support apparatus for a vehicle as described in claim 2, wherein said elongate cross members include a base cross member having ends and being adapted to rest upon a floor of the vehicle, an intermediate cross member which is spaced above said base cross member and which has ends securely attached to a plurality of said upright members, and an upper cross member which is spaced above said intermediate cross member and which has ends securely attached to a plurality of said upright members.

4. A golf bag and accessory support apparatus for a vehicle as described in claim 3, wherein said upright members includes a pair of elongate upright members securely attached along said ends of said elongate cross members, and also includes a pair of brace upright members securely attached to and interconnecting said base cross member and said intermediate cross member.

5. A golf bag and accessory support apparatus for a vehicle as described in claim 4, wherein said arm members have ends which are securely attached to said upper cross member, said arm members being spaced along said upper cross member and extending outwardly generally perpendicular to said upper cross member and being adapted to receive and support golf bags therebetween.

6. A golf bag and accessory support apparatus for a vehicle as described in claim 5, wherein said padded members are securely attached about said upper cross member and about at least a portion of said intermediate cross member.

7. A golf bag and accessory support apparatus for a vehicle as described in claim 6, wherein said means for securing golf bags to said frame includes pairs of strap members having ends securely attached to said frame, said pairs of strap members being spaced along said upper cross member, each pair of strap members being disposed between a respective pair of said arm members which are disposed adjacent to one another.

8. A golf bag and accessory support apparatus for a vehicle as described in claim 2, wherein said elongate cross members include a base cross member having ends and being adapted to rest upon a floor of the vehicle, an intermediate cross member which is spaced above said base cross member and which has ends securely attached to a plurality of said upright members, and a pair of upper cross members which are spaced above said intermediate cross member and which have ends securely attached to a plurality of said upright members, one of said upper cross members being disposed lower than the other of said upper cross members.

9. A golf bag and accessory support apparatus for a vehicle as described in claim 8, further includes a shelf member being hingedly mounted to said lower disposed upper cross member and being disposed horizontally for supporting accessory items thereupon.

10. A golf bag and accessory support apparatus for a vehicle as described in claim 9, wherein said upright members includes a first elongate upright member securely attached along one of said ends of said base cross member, said intermediate cross member, and said higher disposed upper cross member, and also includes a second elongate upright member securely attached to the other of said ends of said base cross member and said intermediate cross member and to one of said ends of said lower disposed cross member, and further includes a pair of brace upright members securely attached to and interconnecting said base cross member and said intermediate cross member, and also includes an intermediate upright member which is securely attached to said intermediate cross members and to the other of said ends of said upper cross members.

11. A golf bag and accessory support apparatus for a vehicle as described in claim 10, wherein said arm members have ends which are securely attached to said higher disposed upper cross member, said arm members being spaced along said higher disposed upper cross member and extending outwardly generally perpendicular to said higher disposed upper cross member and being adapted to receive and support golf bags therebetween.

12. A golf bag and accessory support apparatus for a vehicle as described in claim 11, wherein said padded members are securely attached about said higher disposed upper cross member and about at least a portion of said intermediate cross member.

13. A golf bag and accessory support apparatus for a vehicle as described in claim 12, wherein said means for securing golf bags to said frame includes pairs of strap members having ends securely attached to said frame, said pairs of strap members being spaced along said higher disposed upper cross member, each pair of strap members being disposed between a respective pair of said arm members which are disposed adjacent to one another.

14. A golf bag and accessory support apparatus for a vehicle comprising:
   a frame having a plurality of elongate cross members and a plurality of upright members securely attached to one or more of said elongate cross members;
   a plurality of arm members being spaced apart and securely attached to and extending outwardly from said frame;
   a plurality of padded members securely mounted about portions of said frame and about said arm members;
   means for securing golf bags to said frame; and
   means for fastening said frame to a structure securely disposed inside a vehicle including a clamping member having a shaft portion which is securely mounted to said frame with a fastening member, and further having a U-shaped portion for mounting about a portion of the structure, and further includes a fastener lockingly extendable through end portions of said U-shaped portion.

15. A golf bag and accessory support apparatus for a vehicle as described in claim 14, wherein said elongate cross members include a base cross member having ends and being adapted to rest upon a floor of the vehicle, an intermediate cross member which is spaced above said base cross member and which has ends securely attached to a plurality of said upright members, and an upper cross member which is spaced above said intermediate cross member and which has ends securely attached to a plurality of said upright members; said upright members including a pair of elongate upright members securely attached along said ends of said elongate cross members, and also including a pair of brace upright members securely attached to and interconnecting said base cross member and said intermediate cross member; said arm members having ends which are securely attached to said upper cross member, said arm members being spaced along said upper cross member and extending outwardly generally perpendicular to said upper cross member and being adapted to receive and support golf bags therebetween; said padded members being securely attached about said upper cross member and about at least a portion of said intermediate cross member, said means for securing golf bags to said frame including pairs of strap members having ends securely attached to said frame, said pairs of strap members being spaced along said upper cross member, each pair of strap members being disposed between a respective pair of said arm members which are disposed adjacent to one another.

16. A golf bag and accessory support apparatus for a vehicle as described in claim 14, wherein said elongate cross members include a base cross member having ends and being adapted to rest upon a floor of the vehicle, an intermediate cross member which is spaced above said base cross member and which has ends securely attached to a plurality of said upright members, and a pair of upper cross members which are spaced above said intermediate cross member and which have ends securely attached to a plurality of said upright members, one of said upper cross members being disposed lower than the other of said upper cross members; said golf bag and accessory support apparatus further including a shelf member being hingedly mounted to said lower disposed upper cross member and being disposed horizontally for supporting accessory items thereupon; said upright members including a first elongate upright member securely attached along one of said ends of said base cross member, said intermediate cross member, and said higher disposed upper cross member; and also including a second elongate upright member securely attached to the other of said ends of said base cross member and said intermediate cross member and to one of said ends of said lower disposed cross member; and further including a pair of brace upright members securely attached to and interconnecting said base cross member and said intermediate cross member; and also including an intermediate upright member which is securely attached to said intermediate cross member and to the other of said ends of said upper cross members, said arm members having ends which are securely attached to said higher disposed upper cross member, said arm members being spaced along said higher disposed upper cross member and extending outwardly generally perpendicular to said higher disposed upper cross member and being adapted to receive and support golf bags therebetween; said padded members being securely attached about said higher disposed upper cross member and about at least a portion of said intermediate cross member; said means for securing golf bags to said frame including pairs of strap members having ends securely attached to said frame, said pairs of strap members being spaced along said higher disposed upper cross member, each pair of strap members being disposed between a respective pair of said arm members which are disposed adjacent to one another.

* * * * *